Sept. 3, 1963     S. C. HUGHES     3,102,648
HAND TRUCK
Filed Oct. 19, 1960     2 Sheets-Sheet 1
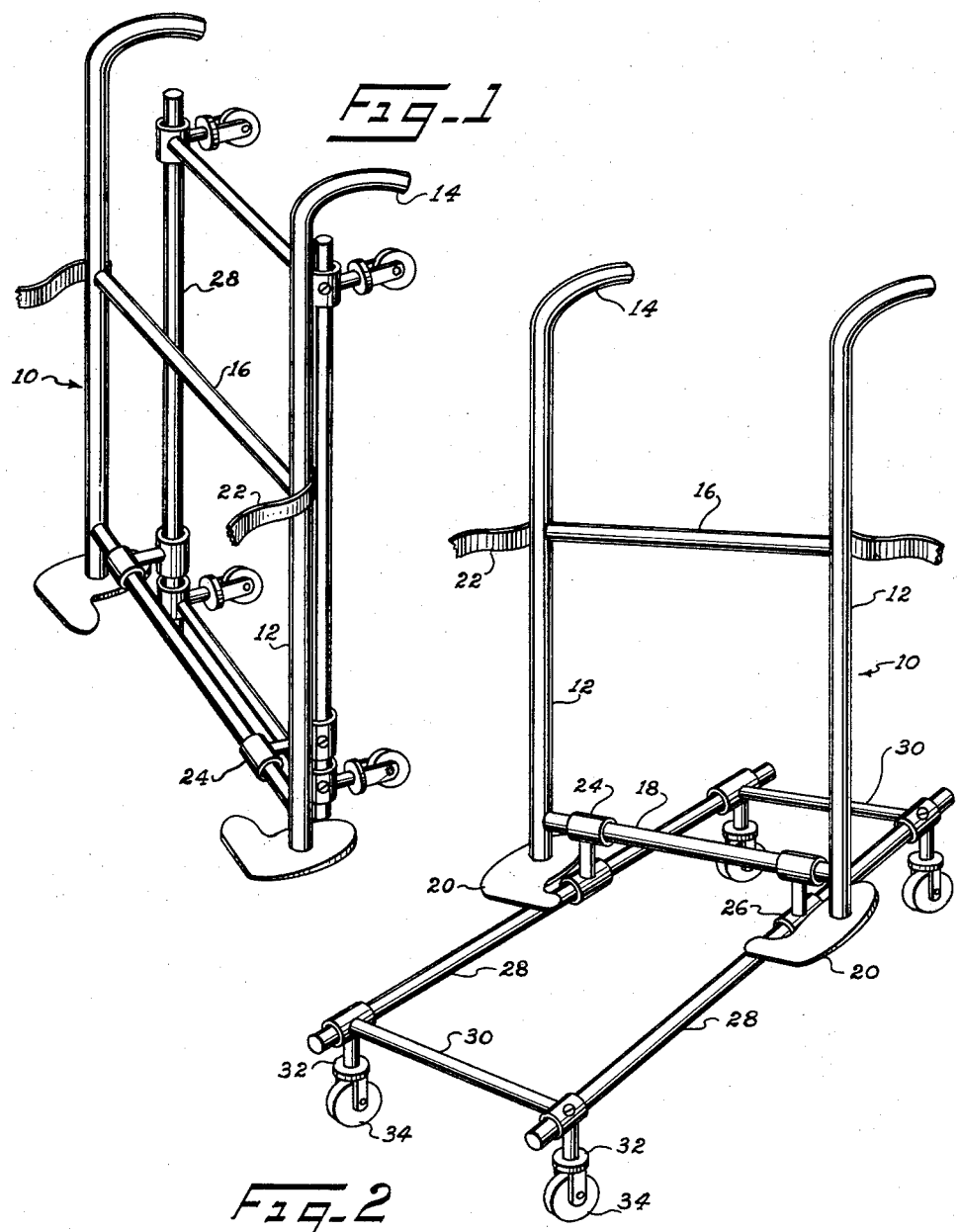
SHANNON C. HUGHES
INVENTOR.
BY Sept. 3, 1963 S. C. HUGHES 3,102,648
HAND TRUCK
Filed Oct. 19, 1960 2 Sheets-Sheet 2
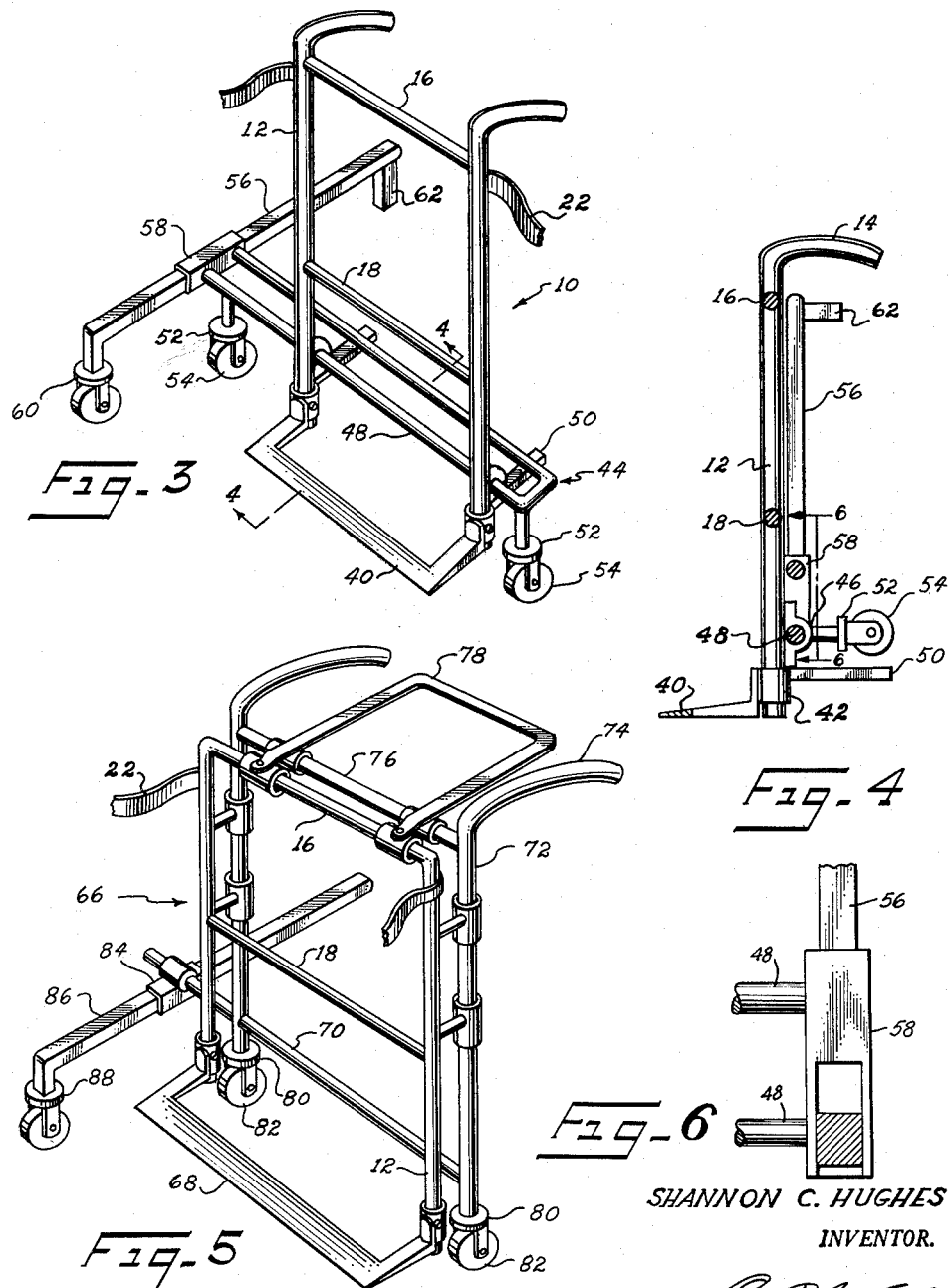
SHANNON C. HUGHES
INVENTOR.

United States Patent Office 3,102,648
Patented Sept. 3, 1963

3,102,648
HAND TRUCK
Shannon C. Hughes, 516 41st St., Lubbock, Tex.
Filed Oct. 19, 1960, Ser. No. 63,679
9 Claims. (Cl. 214—375)

This invention relates to hand trucks and more particularly to a hand truck adapted to be used in moving furniture.

An object of this invention is to provide a hand truck which may be used by women to move household furniture from one location of the home to another.

Another object of this invention is to provide a hand truck which has a helper arm extending under the furniture so that the furniture is supported by three or more wheels and it is not necessary to balance the furniture while moving it.

Another object is to provide a hand truck which is well adapted for moving various shapes and sizes of furniture.

A further object is to provide such a hand truck wherein the furniture may be lifted onto the truck while the three or more wheels are extended so that the truck is always at a state of equilibrium or alternately to provide a hand truck wherein the furniture may be first lifted with the wheels in line and then an additional wheel extended under the furniture thus, offering greater flexibility in use.

Still further objects are to provide a hand truck with caster wheels so that furniture may be manuevered into specific locations by a person inexperienced in the use of hand trucks and furniture moving.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which:

FIG. 1 is a perspective view of one embodiment of this invention in a folded position.

FIG. 2 is a perspective view of the embodiment of FIG. 1 in an un-folded position as it would be used when transporting furniture.

FIG. 3 is a perspective view of a second embodiment in the furniture carrying position.

FIG. 4 is a sectional view of the embodiment shown in FIG. 3 in a folded position taken substantially on line 4—4 of FIG. 3.

FIG. 5 is a perspective view of a third embodiment.

FIG. 6 is an elevational partial view showing the sleeve and how it is slotted, taken on line 6—6 of FIG. 4.

The embodiment of FIGS. 1 and 2 is a four wheeled truck. The truck has a frame 10. This frame includes two upright posts 12. The upper portion of each post terminates with a curved portion forming hand grip 14. The posts are connected by cross bar 16 near the top and a cross bar 18 near the bottom. The lower cross bar 18 also functions as an axle which is horizontal. Foot piece 20 projects forward from the frame at the extreme lower end of each post. Straps 22 are attached towards the upper end of the frame to the posts.

Sleeves 24 encircle the cross bar 18. The sleeves 24 are attached by a short connection member to the second sleeves 26. Bars 28 slide inside the sleeves 26 which have an axis normal to the axis of the sleeves 24 and hence the cross bar 18. The bars are connected into a unitary structure by cross members 30. A caster wheel assembly 32 is attached to each end of each bar. Each caster wheel is mounted for castering or turning about an axis which is normal to the bars. However, this axis is parallel for all four wheels. Each wheel proper 34 is mounted for rotation about its own spindle which is aligned in various directions however, all four of the spindles define a common plane, which is parallel to the plane containing both bars 28.

In use, the truck in the folded position, is moved to the piece of furniture to be moved. The foot pieces 20 are placed under an edge of the furniture and the frame is secured to the furniture by straps 22. Then with the frame remaining in the vertical position the bars are rotated downward. In the folded position the wheels do not support the frame upon the supporting surface, the floor. However, when the bars are rotated downwardly, the wheels are rotated under the frame and the distance from the wheels to the bars 28 plus the distance of the bars from the cross bar 18 causes the frame to be elevated from the floor. As the furniture is secured to the frame, the furniture likewise is elevated. Then the person having elevated the furniture can place one foot on one of the cross members 30 and by pulling upon the hand grips 14 of the frame, pull the frame and the furniture back along the bars. The forward caster wheel assemblies 32 will run under the furniture so that the furniture is supported on more than two wheels making it a stable support. Each foot 20 extends toward the other forward of the cross bar 18. By this means, the frame is prohibited from rotating forward from the vertical when the bars 28 are horizontal. I.e., the feet will rest on the bars and prevent further rotation. To unload, the loading operation is reversed.

It will be understood that any friction bearings such as rollers may be provided between the sleeves 26 and the bar 28, making for easier sliding of the sleeves along the bar after the furniture is elevated before it is moved back along the bars.

In the embodiment illustrated in FIGS. 3 and 4, a certain similarity will be noted to FIGS. 1 and 2, i.e., the embodiment of 3 and 4 likewise has the frame 10 which includes the vertical posts 12 terminating in hand grips 14. Likewise, the frame has cross-bars 16 and 18. Straps 22 are attached to the upper portion of the frame providing additional means for securing furniture to the frame.

Foot 40 extends from bottom of one post 12 to the other. The foot 40 terminates at each end with sleeve 42 attached by a set screw to the bottom of the post 12. In this manner, it may be seen that the foot may be raised to accommodate furniture which has the lower edge some distance off the floor. The entire foot may be removed if there were some delicate molding at the bottom of the furniture and the furniture secured to the frame solely by the straps. The straps would extend around the side of the furniture, across in front of it, and under the furniture, the straps then being tied to the lowest cross bar 18. In this regard, it might be noted that in the embodiment shown in FIGS. 1 and 2 that the foot pieces could be made adjustable in height. Auxiliary adjustable foot pieces could be used inasmuch as the foot piece 20 of that embodiment also strikes the stops to prevent load rotation of the frame. Likewise, the furniture could be secured to the frame of the embodiment of FIG. 1 by the straps alone.

Axle loop 44 is attached to the back of the handle post by journals 46. The journals are bolted or otherwise secured to the back of the post and extend around one of the circular shafts of the axle loop. The axle loop has two parallel shafts 48, one of which extends through the journal 46. In the folded position the other shaft will strike the post to limit the amount of travel of the axle loop to vertical when the frame is vertical. Stops 50 extend normal from the post from the rear of the post immediately below journals 46. Therefore, when the axle loop is horizontal, the stops 50 prevent the rotation of the frame 10 forward. The axle loop not only is rotatable within the journal 46 but may be axially slidable therethrough. The shaft passing the journals 46 functions as an axle in this embodiment.

A caster wheel assembly 52 is attached to each end of the loop axle. The caster wheels are made to rotate about a pivot axis which is normal to the planes defined by the two parallel shafts 48. The wheels proper 54 rotate about spindles which are always located in a plane which is parallel to the plane defined by the parallel shafts 48. When the loop axles are in a vertical folded position, the caster wheels will not touch the supporting surface. However, when the loop axle is rotated to a horizontal position, the contact of the wheels with the floor will elevate the frame to a higher position.

The rotation of the loop axle is achieved by bar 56 which extends through sleeve 58 attached by welding or otherwise to one end of the loop axle. The bar 56 lies in the same plane as that defined by the parallel shafts 48 but extends normal to the individual shafts 48. The bar and the sleeve are of a similar non-round cross sectional shape so that the bar may slide in the sleeve but may not rotate about its axis therein. Wheel assembly 60 is on the lower end of the bar when the vehicle is in a folded position. Sleeve 58 is slotted so that wheel assembly 60 is in line with the caster wheel assembly 52 when the vehicle is in folded position and when the bar is in a fully retracted position. However, after the furniture has been elevated by rotation of the loop axle, the bar may be slid forward through the sleeve so that the caster wheel assembly 60 will extend forward from the frame and therefore form a stable vehicle with three wheels which are not in line. Bar 56, functioning as a helper arm, may extend along either side of the furniture to be moved or in case of a wide object it may be nearer the middle of it. The bar 56 is made as low as possible to extend under the furniture.

The frame may be adjusted on the loop axle so that normally the helper arm is as close to the object as possible with the frame still being centered to the side of the furniture to which it is secured. Contact 62 on bar 56 may be pressed against the floor by the foot of the operator while the frame is pulled toward the operator, thus moving wheel assembly 60 under the furniture.

The embodiment shown in FIG. 5 is similar to the other embodiments in that the frame has some similarity to the others. In this case, the frame 66 has straps 22 to help secure the furniture to it as before. The frame has vertical posts 12 and upper cross member 16 and lower cross bar member 18. Likewise, the frame has foot 68 attached to the bottom of the post members 12. The foot is adjustably attached as previously described or removable so that the furniture may be secured to the frame as previously outlined. The truck itself includes an axle 70. Two standards 72 extend upward from the axle and are bent at the top to form hand grips 74. There is a cross member 76 attaching the standards near the upper portion thereof. Lever 78 fulcrums over the cross member 76 and is pivoted at one end to the upper cross bar 16 of the frame 66. Therefore, it may be seen that if the free end of the lever is rotated downward this will lift the frame 66 relative to the axle 70. A latch, not shown, holds the lever down. The axle 70 has a caster wheel assembly 80 at each end. With the standards in a vertical position these caster wheels rotate about a vertical axis and the wheels proper 82 will always rotate about spindles which are horizontal if the standards are vertical. One end of the axle has horizontal sleeve 84 which extends forward from the frame so that bar 86 in the sleeve may be extended. Caster wheel assembly 88 is attached at the terminal of the bar forward of the frame, thus under any furniture which may be loaded thereon. The bar 86 is low to pass under furniture if desired.

It will be understood that although I have spoken of the helper arm or bar with the helper wheel extending to the side of the furniture that on long pieces of furniture it could extend under the furniture.

It will be apparent that the embodiments shown are only exemplary and that various modifications can be made in construction, materials, and arrangement within the scope of the invention as defined in the appended claims.

I claim as my invention:

1. A hand truck comprising: a frame, means attached to the frame for securing furniture to the front of the frame, means operatively associated with the frame for moving the frame and furniture upward, a bar, a wheel connected to the bar, the bar attached to the frame for sliding the wheel forward of the frame, and a plurality of additional wheels attached to the truck back of the aforementioned wheel connected to the bar.

2. The invention as defined in claim 1 wherein the plurality of additional wheels are connected to the bar.

3. The invention as defined in claim 1 with the addition of an axle, the bar sliding through a sleeve attached to the axle, standards attached to the axle and extending upward from said axle, and wherein said means for moving the frame upward interconnects the frame to the standards.

4. The invention as defined in claim 1 wherein said means for securing objects to the frame includes a foot attached to the frame for vertical adjustment near the bottom of the frame and straps attached to the frame near the top of the frame.

5. The invention as defined in claim 1 wherein the means for moving the frame upward includes a horizontal axle attached to the frame, said bar pivoted about the axis of the axle, whereby rotation of the bar about the axis causes the wheel to raise the frame by a reaction of the wheel against a supporting surface.

6. The invention as defined in claim 5 with the addition of a stop operatively associated between the frame and bar to limit the rotation of the frame forward relative to the bar when the frame is vertical.

7. A hand truck comprising: an upright frame having a horizontal axle, the bottom of the frame having a horizontal foot extending outward therefrom, said foot extending from the forward face of the frame, a pair of sleeves attached to the frame, said sleeves pivoted around said horizontal axle of said frame, a bar in each sleeve, said bars adapted to slide within the sleeves, said bars being interconnected, and wheels attached at each end of each bar, so that when the frame and bars are both vertical the wheels do not bear against the supporting surface but when the bars are rotated to a horizontal position with the frame vertical, the wheels bear against the ground and lift the foot of the frame to a position above the now horizontal bars, then upon sliding the bars through the sleeves, said foot extends over said bars so the frame cannot rotate forward in this position.

8. A hand truck comprising: a vertically aligned frame, said frame including two vertically aligned posts with cross members therebetween, vertical sleeves surrounding said posts and adjustably attached thereto, a foot extending horizontally outward attached to the vertical sleeves, so that the foot may be adjusted vertically, a journal on the back of each post, an axle rotatably and slidably connected by said journal to said post, a sleeve securely attached to one end of said axle, a bar slidably attached in said sleeve, said bar and sleeve being non-round in cross section so that the bar cannot rotate in the sleeve, a wheel rotatably attached on end of said bar, additional wheels rotatably attached at each extremity of the axle, so that when the bar is in a position parallel to the frame that the axle is so rotated that the wheels do not bear against the supporting surface but if the bar is rotated to a horizontal position with the frame in a vertical position, the wheels bear against the supporting surface lifting the frame from the supporting surface.

9. A hand truck comprising: an axle, a tube securely attached to one end of the axle, a bar slidable through said tube, means for preventing the bar from rotating in said tube, a wheel rotatably mounted on one end of the bar, standards extending vertically upward from the axle, a frame mounted on the standards for vertical movement relative thereto, means for moving the frame vertically relative to the axle, and means attached to the frame for securing furniture to the frame.

References Cited in the file of this patent

UNITED STATES PATENTS

| | | |
|---|---|---|
| 1,431,861 | Adams | Oct. 10, 1922 |
| 2,439,581 | Robins | Apr. 13, 1948 |
| 2,598,168 | Hooz et al. | May 27, 1952 |
| 2,827,190 | Spitzmesser | Mar. 18, 1958 |
| 2,860,887 | Stewart | Nov. 18, 1958 |

FOREIGN PATENTS

| | | |
|---|---|---|
| 339,059 | Switzerland | July 31, 1959 |
| 831,520 | Germany | Feb. 14, 1952 |